United States Patent Office 2,794,015
Patented May 28, 1957

2,794,015
POLYMERS

Harold L. Jackson, Lancaster Court, Del., and William K. Wilkinson, Waynesboro, Va., assignors to E. I. du Pont de Nemours & Company, Wilmington, Del., a corporation of Delaware No Drawing. Application November 3, 1953, Serial No. 390,073

8 Claims. (Cl. 260—79.3)

This invention relates to polymeric materials. More particularly, it relates to new polymers having improved properties, especially with respect to their receptivity of acid and basic dyes.

Polymers of acrylonitrile possess a number of properties which make them of considerable value for various purposes. For example, they are relatively high melting, strong, and inert to water and common organic solvents. However, polyacrylonitrile as commonly prepared is difficult to dye with acid or basic dyes and, consequently, this polymer cannot be used in those applications requiring certain colored polymers, e. g., as fibers in fabrics of certain colors and shades. In attempts to improve the hydrophilic properties of acrylonitrile polymers, the monomer has been copolymerized with small amounts of a copolymerizable unsaturated sulfonate. These particular copolymers have been still further modified by copolymerization with minor amounts of 2- or 4-vinylpyridine or like material in order to make the copolymers dyeable with acid dyes (U. S. 2,601,256). Similarly, the receptivity of acrylonitrile polymers to acid dyes has been improved by the copolymerization of acrylonitrile with small amounts of unsaturated monomers having basic substituents, such as tertiary amine groups. In particular, the receptivity of acrylonitrile polymers to acid dyes has been improved by the copolymerization of the acrylonitrile with quaternary ammonium salts containing polymerizable vinyl substituents (U. S. 2,572,560 and U. S. application Serial No. 216,838, filed March 21, 1951, by A. L. Barney. While these proposed modifications improve the receptivity of the polymers to acid dyes, it is desirable for use in certain applications to have acrylonitrile polymers which are readily dyeable by both acid and basic dyes.

This invention has as an object the preparation of new polymers. A further object is the preparation of new terpolymers dyeable, in extended form, by acid and basic dyes. Other objects will appear hereinafter.

These objects are accomplished by the present invention of polymers having at least three monomer components and containing at least 85%, based on the weight of the copolymer, of acrylonitrile units, at least 0.5%, by weight, of units of a polymerizable quaternary ammonium salt having monoethylenic unsaturation, and at least 0.5%, by weight, of units of a polymerizable sulfonic acid having monoethylenic unsaturation, or a water-soluble salt thereof. The polymer can contain, subject to the above limitations, units of other monoethylenically unsaturated polymerizable monomers, e. g., vinyl chloride, vinylidene chloride or cyanide, vinyl acetate, vinylpyridines, styrene, methyl acrylate, methyl methacrylate, acrylic acid, methyl vinyl ketone, and diethyl maleate, etc., or mixtures thereof. A preferred group of the copolymers of this invention is that in which the sulfonate comonomer is a water-soluble, alkali metal or ammonium salt of a hydrocarbon sulfonic acid and the quaternary ammonium comonomer is one having a quaternary cation consisting of hydrocarbon or acrylyloxy (or α-alkylacrylyloxy) alkyl groups attached to the quaternary nitrogen atom.

The products of this invention can be made by copolymerizing a mixture of polymerizable monoethylenically unsaturated monomers containing at least 85% by weight of acrylonitrile, at least 0.5%, and preferably 2 to 5%, of a polymerizable monoethylenically unsaturated sulfonic acid or its water-soluble salt, and at least 0.5%, and preferably 4 to 10%, of a polymerizable monoethylenically unsaturated quaternary ammonium salt. Preferably, the polymerization is carried out in an aqueous medium in the presence of a free radical liberating addition polymerization initiator. Initiator systems of the redox type are very satisfactory in this process. Water-soluble azo initiators, e. g., α,α'-azodiisobutyramidine hydrochloride, are useful. The polymerization is carried out at temperatures up to 100° C., the exact temperature selected being dependent on the particular initiator, or initiator system, being used. Temperatures of 130° C. or higher are not desirable since quaternary ammonium salts begin to decompose at about 130° C. Preferably, the polymerization is carried out in an aqueous medium so that the resulting copolymer is obtained in a uniform, finely divided state which can be readily isolated and purified.

Although an aqueous solution polymerization method is preferred, the products of this invention can be prepared by other common methods for polymerizing ethylenically unsaturated compounds. For example, organic solvents can be employed provided that a liquid which is a solvent for all the comonomers is selected as the reaction medium. Similarly, the polymerization can be carried out by the emulsion polymerization technique, when the mixture of monomers being polymerized contains one or more monomers which are water-insoluble.

The following examples in which parts are by weight are illustrative of the invention.

*Example I*

A reaction vessel capable of withstanding superatmospheric pressure is flushed with dry nitrogen and then charged to about 60% of its volume with 190 parts of air-free distilled water, 13.0 parts (0.245 mole) of freshly distilled inhibitor-free acrylonitrile, 0.36 part ($2.3 \times 10^{-3}$ mole) of sodium 2-methyl-2-propenesulfonate, 0.70 part ($2.5 \times 10^{-3}$ mole) of β-methacrylyloxyethyltrimethylammonium methylsulfate, 0.103 part of sodium bisulfite, 0.34 part of potassium monobasic phosphate, and 0.205 part of ammonium persulfate. The resultant mixture exhibits a pH of 5. The reaction vessel is closed under a nitrogen atmosphere and the reactor is tumbled for three hours in a water bath maintained at 40° C. The reaction mixture is then cooled to room temperature, and the white polymer which forms is separated by filtration and then washed thoroughly with distilled water and acetone, and finally dried. The dry polymer amounts to 7.5 parts, corresponding to a yield of 53.3%. This product, a copolymer of acrylonitrile, sodium 2-methyl-2-propenesulfonate, and β-methacrylyloxyethyltrimethylammonium methylsulfate in the proportions of 92.5%, 2.5%, and 5% by weight (molar ratio 98:1:1) is soluble in dimethylformamide. A 7% solution of the copolymer in dimethylformamide is prepared and spread on glass to form a film 2.4 mils in thickness. The resulting film is clear, colorless, and brittle when dry, although it is pliable at high humidity.

A portion of the above film is boiled in 0.5% aqueous "Ivory" soap solution for ten minutes and then rinsed with tap water. A portion of the boiled-off film is placed in a 1% aqueous solution of a basic green dye, colour index No. 662, (pH 3) and boiled for one hour. After thorough rinsing with tap water, the dyed film is boiled off again in 0.5% "Ivory" soap solution, rinsed, and dried. The resulting film exhibits excellent absorption of this basic dye. The absorption is equal to, or better than, a film cast from a two-component copolymer prepared from a 99/1 mole ratio fixture of acrylonitrile and sodium 2-methyl-2-propenesulfonate.

A second portion of the original boiled-off film of the preceding paragraph is treated at a boil for one hour with a 4% aqueous solution (pH 9) of an acid green dye, colour index No. 1078 (Rowe—colour index, 1st supplement (1928) to 1st edition (1924), Soc. Dyers Colourists, Bradford, England). After rinsing, boiling off with "Ivory" soap solution, and drying, this acid dye is found to be absorbed very well. The absorption is at least equal to the absorption of a two-component copolymer from a 99/1 mole ratio mixture of acrylonitrile and β-methacrylyloxyethyltrimethylammonium methylsulfate.

A third portion of the original boiled-off film dyes equally well with a 4% solution of an acid green dye, colour index No. 1078, at a pH of 3. Thus the terpolymer dyes equally well with acid and basic dyes.

In contrast to the above results with the three-component copolymer of this invention, a film obtained from a mixture of dimethylformamide solutions of equivalent quantities of a copolymer from a 99/1 mole ratio mixture of acrylonitrile and sodium 2-methyl-2-propenesulfonate and a copolymer from a 99/1 mole ratio mixture of acrylonitrile and β-methacrylyloxyethyltrimethylammonium methylsulfate accepts acid green dye, colour index No. 1078, and basic green dye, colour index No. 662, only slightly better than films of unmodified polyacrylonitrile.

A test of the thermal stability of the copolymer of Example I is made by heating a sample of the undyed film of that example at 165° C. for sixty minutes. The film yellows to a greater degree than a film of the homopolymer of acrylonitrile, but not nearly as much as a film of a copolymer from a 99/1 mole ratio mixture of acrylonitrile and β-methacrylyloxyethyltrimethylammonium methylsulfate. Thus the presence of the sulfonate component increases the stability of an acrylonitrile polymer containing a quaternary ammonium salt component. Where a three-component copolymer of optimum stability is desired, more than an equivalent amount of the sulfonate component should be employed with respect to the amount of quaternary ammonium salt present.

The effect of the sulfonate component of the copolymers of this invention on their dyeability by basic dyes is outstanding in comparison with the effect of a carboxylic acid or water-soluble salt of a carboxylic acid on an acrylonitrile copolymer. Thus, for example, a film of a three-component copolymer prepared from a 98/1/1 mole ratio mixture of acrylonitrile, β-methacrylyloxyethyltrimethylammonium methylsulfate, and sodium methacrylate or methacrylic acid does not absorb the basic green dye, colour index No. 662, as well as a film of the copolymer of Example I.

Example II

A mixture of 120 parts of air-free distilled water, 19.0 parts of freshly distilled, inhibitor-free acrylonitrile, 2.7 parts of β-methacrylyloxyethyltrimethylammonium methylsulfate, and 1.0 part of sodium 2-methyl-2-propenesulfonate (a molar ratio of 96:2.7:1.3) is stirred rapidly in an atmosphere of dry nitrogen. This mixture is warmed to 58° C. and a solution of 0.42 part of potassium persulfate in 5.0 parts of water is added rapidly followed by a solution of 0.17 part of sodium bisulfite in 2.0 parts of water. The temperature is maintained at 55–60° C. for four hours with stirring. The resulting white slurry is acidified with 400 parts of 1 N sulfuric acid, and the solid polymer is separated by filtration and washed thoroughly with distilled water. The yield of the dried copolymer is 16.1 parts.

Portions of a film cast from a 7% solution of the copolymer of Example II in N,N-dimethylformamide are dyed with a basic green dye, colour index No. 662, and with a green acid dye, colour index No. 1078, according to the procedure used in dyeing films of the copolymer of Example I. The film of the copolymer of Example II exhibits excellent absorption of both dyes. The absorption of the acid green dye, colour index No. 1078, by this copolymer is much greater than that of an acrylonitrile/2-vinylpyridine/sodium 2-methyl-2-propenesulfonate copolymer of the same molar proportions, i. e., 96:2.7:1.3, prepared according to the procedure of Example VII of U. S. Patent 2,601,256. The two copolymers dye equally well with the basic green dye, colour index No. 662.

The results described in the preceding paragraph are also obtained when a copolymer having a 98:1:1 mole ratio of acrylonitrile/2-vinylpyridine/sodium 2-methyl-2-propenesulfonate is compared with a 98:1:1 mole ratio acrylonitrile/β - methacrylyloxyethyltrimethylammonium methylsulfate/sodium 2-methyl-2-propenesulfonate polymer.

Example III

A polymer is prepared from a 94:1:5 acrylonitrile/β-methacrylyloxyethyltrimethylammonium methyl sulfate/sodium 2-methyl-2-propenesulfonate mixture by the procedure described in Example I.

A film cast from a N,N-dimethylformamide solution of the copolymer of Example III exhibits excellent absorption of both the basic green dye, colour index No. 662, and the acid green dye, colour index No. 1078. Furthermore, this terpolymer exhibits a thermal stability, as evidence by film discoloration at 165° C. for 60 minutes, greater than that of the 98:1:1 mole ratio terpolymer of Example I. The thermal stability of the 94:1:5 terpolymer of Example III appears to equal or slightly exceed that of polyacrylonitrile.

The sulfonate component of the three-component copolymers of this invention can be any addition polymerizable sulfonic acid having a single ethylenic unsaturation, or a water-soluble salt thereof. Specific examples of other such sulfonic acids which are operable as comonomers include ethenesulfonic acid, p-vinylbenzenesulfonic acid, 1-vinylbenzene-2,4-disulfonic acid, 2-propenesulfonic acid, 2-methyl-2-propenesulfonic acid, 2-allyloxyethanesulfonic acid, 2-(α-methallyloxyethanesulfonic acid, 3-allyloxy-2-hydroxypropanesulfonic acid, 2-allylthioethanesulfonic acid, 3-allylthio-2-hydroxypropanesulfonic acid, and the water-soluble salts of these acids, e. g., ammonium, substituted ammonium, sodium, lithium, potassium, magnesium, calcium, aluminum, or other water-soluble metal salts, these water-soluble salts and the acids being comprehended by the term "water-soluble sulfonate." These sulfonic acids and their salts can be made by well-known methods. For example, sodium 2-methyl-2-propenesulfonate can be prepared by the reaction of sodium sulfite with methallyl chloride. In another method, ethylene dibromide can be reacted with sodium sulfite and then dehydrobrominated to produce sodium ethenesulfonate.

Any polymerizable quaternary ammonium salt having a single ethylenic unsaturation can be used as the quaternary ammonium salt component of the polymers of this invention. Examples of specific quaternary ammonium salts which are operable include β-methacrylyloxyethyltrimethylammonium methylsulfate, β-methacrylyloxymethyltrimethylammonium methylsulfate, β-methacrylyloxyethyldiethylmethylammonium methylsulfate, 2- and 4-vinyl-N-methylpyridinium chloride, 4-vinyl-N-n-butylpyridinium bromide, β-methacrylyloxyethyltriethylammonium p-toluenesulfonate, carbovinyloxymethyltriethylammonium chloride, vinyloxyethyltriethylammonium chloride, N-butyl-5-ethyl-2-vinylpyridinium iodide, and N-propyl-2-vinylquinolinium methylsulfate. The quaternary ammonium salts used in the process of this invention can be made by known methods; for example, by the reaction of a tertiary amine with a hydrocarbon ester of an inorganic acid. Thus, the tertiary amine can be reacted with alkyl halides, e. g., methyl iodide, butyl bromide, ethyl chloride; alkyl sulfates, e. g., methyl sulfate, and alkyl sulfonates, e. g., ethyl p-toluenesulfonate; alkyl phosphates, e. g., triethyl phosphate; and alkyl phosphites, e. g., triethyl phosphite. Polymerizable quaternary ammonium salts having, in the cation, three alkyl groups and one alpha-methylene alkanoyloxy group attached to the nitrogen are preferred.

Acrylonitrile of high purity is available commercially. The commercial monomer, after removal of the customary polymerization inhibitors, for example by distillation prior to use, is satisfactory for use in this process.

The polymerization initiator employed in the process of this invention can be any free radical liberating initiator. Suitable types of these initiators are the peroxygen compounds, e. g., potassium persulfate, and benzoyl peroxide; azo compounds having the acyclic azo, —N=N—, group joined to discrete non-aromatic carbons at least one of which is a tertiary carbon in turn joined to carbon whose remaining valences are satisfied by oxygen or nitrogen or both (as in U. S. Patent 2,471,959), e. g., azodiisobutyronitrile; combinations of thiourea with hydrogen peroxide, a bromate with a bisulfite, hydrogen peroxide with a titanous salt, and the like. Catalysts of this latter type, which are of the redox type, are especially effective in aqueous media at relatively low temperatures, e. g., 0° to 40° C. The amount of initiator employed in this process is generally small, for example, amounts ranging from 0.001 to 5% of the weight of the polymerizable monomers can be used.

The copolymers of this invention are useful for a number of purposes, particularly for the manufacture of fibers and self-supporting films. In view of their good receptivity to both acid and basic dyes, these copolymers are especially well suited for the manufacture of fibers to be used in colored textiles of various types. In their use in the preparation of fibers and films, the copolymers of this invention can be, if desired, modified by incorporation of common modifying agents, such as, for example, plasticizers, stabilizers, pigments, spinning agents, etc.

The term "ethylenic unsaturation" is employed to indicate a non-aromatic carbon to carbon double bond. The term "monoethylenically unsaturated" is used to describe a compound having but one non-aromatic carbon to carbon unsaturation and that a double bond.

When in the claims a sulfonic acid is used this is to be taken to include the equivalent water soluble salts.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A terpolymer consisting of 92.5%, by weight, of acrylonitrile units, 2.5%, by weight, of units or sodium 2-methyl-2-propenesulfonate, and 5%, by weight, of units of β-methacrylyloxyethyltrimethylammonium methylsulfate.

2. A copolymer containing at least 85%, by weight, of acrylonitrile units, 2–5%, by weight, of units of sodium 2-methyl-2-propenesulfonate, and 4–10%, by weight, of units of β-methacrylyloxyethyltrimethylammonium methylsulfate.

3. A copolymer containing at least 85%, by weight, of acrylonitrile units, at least 0.5%, by weight, of units of sodium 2-methyl-2-propenesulfonate, and at least 0.5%, by weight, of units of β-methacrylyloxyethyltrimethylammonium methylsulfate.

4. A copolymer containing at least 85%, by weight, of acrylonitrile units, 2–5%, by weight, of units of a polymerizable water-soluble salt of a hydrocarbonsulfonic acid having ethylenic unsaturation in the anion, and 4–10%, by weight, of units of a polymerizable quaternary ammonium salt having, in the cation, three alkyl groups and one alpha-methylenealkanoyloxy group attached to the nitrogen.

5. A copolymer containing at least 85%, by weight, of acrylonitrile units, at least 0.5%, by weight, of units of a polymerizable water-soluble salt of a hydrocarbonsulfonic acid having ethylenic unsaturation in the anion, and at least 0.5%, by weight, of units of a polymerizable quaternary ammonium salt having, in the cation, three alkyl groups and one alpha-methylenealkanoyloxy group attached to the nitrogen.

6. A copolymer containing at least 85%, by weight, of acrylonitrile units, at least 0.5%, by weight, of units of a polymerizable water-soluble hydrocarbonsulfonate of the class consisting of the hydrocarbonsulfonic acid and salts thereof having ethylenic unsaturation in the sulfonate anion, and at least 0.5%, by weight, of units of a polymerizable quaternary ammonium salt having, in the cation, three alkyl groups and one alpha-methylenealkanoyloxy group attached to the nitrogen.

7. A copolymer containing at least 85%, by weight, of acrylonitrile units, at least 0.5%, by weight, of units of a polymerizable water-soluble sulfonate having ethylenic unsaturation in the anion and of the class consisting of the sulfonic acid and salts thereof and at least 0.5%, by weight, of a polymerizable quaternary ammonium salt having ethylenic unsaturation in the cation.

8. A copolymer containing at least 85%, by weight, of acrylonitrile units, 2–5%, by weight, of units of a polymerizable water-soluble sulfonate having ethylenic unsaturation in the anion and of the class consisting of the sulfonic acid and salts thereof and 4–10%, by weight, of a polymerizable quaternary ammonium salt having ethylenic unsaturation in the cation.

References Cited in the file of this patent

UNITED STATES PATENTS

| | | |
|---|---|---|
| 2,572,560 | Ham | Oct. 23, 1951 |
| 2,572,561 | Ham | Oct. 23, 1951 |
| 2,601,256 | Bruson | June 24, 1952 |